United States Patent Office 3,594,370
Patented July 20, 1971

3,594,370
PRODUCTION OF 7-AMINOCEPHALOSPORANIC ACID
Harvey M. Higgins, Jr., Danville, and Thomas W. McIntyre, Indianapolis, Ind., assignors to Eli Lilly and Company, Indianapolis, Ind.
No Drawing. Continuation-in-part of application Ser. No. 738,083, June 19, 1968. This application May 15, 1969, Ser. No. 825,066
Int. Cl. C07d 99/24
U.S. Cl. 260—243
6 Claims

ABSTRACT OF THE DISCLOSURE

In the preparation of 7-aminocephalosporanic acid (7-ACA) by the chemical deacylation of cephalosporin C and salts thereof with nitrosyl chloride and recovery of 7-ACA by the evaporation of the solvents, increased yields are obtained by the addition, prior to the evaporation of the solvents, of a substance that destroys excess nitrosyl chloride and decreases undesirable side reactions.

CROSS-REFERENCE

This application is a continuation-in-part of our co-pending application Ser. No. 738,083, filed June 19, 1968, now abandoned.

BACKGROUND OF THE INVENTION

Cephalosporin C, which is obtained by fermentation as described in British patent specification 810,916, has a low order of biological activity. Therefore, it is necessary to chemically convert cephalosporin C to more active derivatives. This chemical conversion involves the cleavage of the amido group in the 7-position of cephalosporin nucleus to obtain 7-ACA.

Processes for the production of 7-ACA by the chemical cleavage of the 7-amido group of cephalosporin C or a salt thereof are described in U.S. Pats. Nos. 3,188,311 and 3,367,933. The first of these patents described a process whereby cephalosporin C, 7-(5'-amino-N'-adipamyl) cephalosporanic acid, or a salt is treated with a reagent which induces deamination of the 5'-amino group and consequent cyclization of the resultant carbonium ion to the stabilized imino-lactone derivative of 7-ACA. This cyclic intermediate is then hydrolytically cleaved to yield 7-ACA. The reaction is conducted in a solvent which is preferably formic acid. Useful reagents for converting cephalosporin C to the cyclic intermediate include nitrosating agents, carbocyclic arenediazonium salts, and compounds that afford positive halogen. Upon completion of the reaction of cephalosporin C with this reagent the solvent is removed by evaporation and the 7-ACA is recovered by the addition of water to the residue from the evaporation, followed by precipitation of the 7-ACA from aqueous solution by the addition of a base to a pH of about 3.5.

U.S. Patent 3,367,933 described an improvement on this process in which the solvent comprises formic acid and a diluent which may be a nitroloweralkane, nitrobenzene, a haloloweralkane containing both hydrogen and halogen atoms, or a loweralkyl nitrile, and the intermediate cyclic compound is treated with methanol. The methanol treatment may be effected by evaporation of the solvent followed by treatment of the residue with methanol, or alternatively, the reaction mixture may be added to a large volume of methanol without evaporation of the solvent. In either case the 7-ACA is then precipitated from solution by the addition of a base.

The solvent system employed in the cleavage reaction may be reused after recovery from the reaction mixture. This recovery of the solvent is simplified if the solvent evaporation method of product recovery is employed. If the 7-ACA is recovered by the addition of the reaction mixture to methanol, the formic acid is converted to methyl formate and cannot be reused. Too, it is necessary to completely remove the methanol from the diluent, if one was used, prior to reuse since methanol reacts with nitrosyl chloride, which is the preferred nitrosating agent for use in the process. Therefore, it is economically desirable to recover the 7-ACA by the solvent evaporation method. However, heretofore the use of this method has resulted in lower yields of 7-ACA which more than offsets the lower processing cost resulting from the simplified solvent recovery.

SUMMARY

We have now found that in the production of 7-ACA by treating cephalosporin C or a salt thereof with a nitrosating agent, a carbocyclic arenediazonium salt or a compound that affords positive halogen at a temperature of not more than 60° C. in a solvent, followed by removal of the solvent from the reaction mixture to leave a residue, and recovering the 7-ACA from the residue, improved yields of 7-ACA are obtained by the addition of a substance that destroys excess cyclizing reagent prior to concentration. By the use of our improved process, increased yields of 7-ACA are obtained, yet the solvent can be economically recovered for reuse.

DESCRIPTION OF THE PREFERRED EMBODIMENT

Our process is an improvement on the prior solvent evaporation method of recovering 7-ACA. In accordance with our improvement a substance that destroys unreacted cyclizing reagent is added to the reaction mixture prior to the evaporation of the solvent. As a result of the use of such an additive high yields of 7-ACA are recovered.

The initial reaction step may be conducted as described in U.S. Pats. Nos. 3,188,311 and 3,367,933. The reaction may be conducted in formic acid alone; however, it is preferred to use formic acid with a diluent as described in the latter patent. This diluent is preferably acetonitrile or a mixture of nitromethane and 2-nitropropane. Other diluents are described in U.S. 3,367,933.

The reagent employed in the cleavage reaction is preferably nitrosyl chloride. Other suitable reagents include nitrosating agents, carbocyclic arenediazonium salts and substances affording positive halogen as described in U.S. 3,188,311. For simplicity, we shall refer throughout this specification to nitrosyl chloride with the understanding that other reagents may be used. The molar ratio of nitrosyl chloride to the starting cephalosporin compound must be at least 1:1 and is preferably within the range of 1.5:1 to 2.5:1.

The reaction is quite rapid at temperatures above about −10° C. and is substantially complete upon completion of mixing at these temperatures. Thus, it will be necessary to allow the reaction to continue for only a short time such as, for example, 5 to 15 minutes after addition of nitrosyl chloride is complete. Lower temperatures may be used but longer reaction times are required. The reaction should be conducted at temperatures below 60° C., preferably below 20° C.; and still more preferably at about 0° C. such as between −10° C. and +5° C.

At the completion of the reaction there is added a substance that reacts with and destroys the excess nitrosyl chloride. The excess of nitrosyl chloride can readily be calculated in any given case. An amount of additive approximately equivalent to the excess nitrosyl chloride may be used. We have found yields of 7-ACA to be optimal when about 0.75–0.9. equivalent of additive is used, based on excess nitrosyl chloride. Some yield improvement is obtained when more or less than this optimum amount of additive is used. The practical range of additive is about 0.2–2.5 equivalents, based on excess nitrosyl chloride.

Any substance that will destroy the excess cyclizing reagent may be used as the additive in our improved process. Among the classes of compounds that may be employed are sulfamates, sulfamides, semicarbazides, thiosemicarbazides, carbazides, thiocarbazides, thioureas, carbamates, thiocarbamates, carbazates, thiocarbazates, hydrazines, hydrazides, thiohydrazides, and hydrocarbons containing olefinic unsaturation.

The above classes of compounds may be represented by the following formulas:

| | |
|---|---|
| Sulfamates | $MSO_3NH_2$ |
| Sulfamides | $YSO_2NH_2$ |
| Sulfonylhydrazides | $YSO_2NHNH_2$ |
| Semicarbazides and thiosemicarbazides | $R_2N-\overset{X}{\underset{\|}{C}}-NHNH_2$ |
| Carbazides and thiocarbazides | $R_2NNH-\overset{X}{\underset{\|}{C}}-NHNH_2$ |
| Thioureas | $R_2N-\overset{S}{\underset{\|}{C}}-NH_2$ |
| Carbamates and thiocarbamates | $H_2N-\overset{X}{\underset{\|}{C}}-OR'$ |
| Carbazates and thiocarbazates | $H_2NNH-\overset{X}{\underset{\|}{C}}-OR'$ |
| Hydrazines | $R_2N-NH_2$ |
| Hydrazides and thiohydrazides | $R'-\overset{X}{\underset{\|}{C}}-NHNH_2$ |
| Unsaturated hydrocarbons | $Z_2C=CHZ$ | wherein:

M is hydrogen, $NR_4$, or an alkali metal such as sodium or potassium;
X is oxygen or sulfur;
Y is R or $NR_2$;
Z, taken alone, is R or a group having the formula

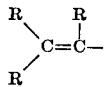

or two Z's together with the atoms to which they are attached form a ring containing five or six carbon atoms;

R is hydrogen, $C_1$–$C_6$ alkyl, or $C_6$–$C_{12}$ aryl or aralkyl such as, for example, methyl, ethyl, propyl, hexyl, phenyl, tolyl, p-t-butylphenyl, and benzyl; and R' is $C_1$–$C_6$ alkyl or $C_6$–$C_{12}$ aryl or aralkyl Specific examples of suitable additives include ammonium sulfamate, potassium sulfamate, tetramethylammonium sulfamate, sulfamide, methylsulfamide, phenylsulfamide, methane sulfonylhydrazide, semicarbazide, thiosemicarbazide, ethyl semicarbazide, benzyl thiosemicarbazide, carbazide, thiocarbazide, methyl carbazide, tolyl thiocarbazide, thiourea, methyl thiourea, ethyl carbamate, ethyl thiocarbamate, phenyl carbamate, methyl carbamate, ethyl carbazate, ethyl thiocarbazate, hydrazine, methylhydrazine, tolylhydrazine, ethylenediamine tetraacetic acid hydrazide, isobutylene, propylene, butene-1, cyclohexene, and butadiene.

It will be noted that the additives we have found to be effective contain one of the following groups in the molecule:

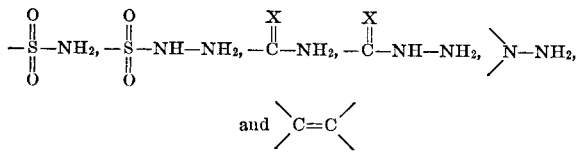

This suggests that it is the presence of such a group that is responsible for the beneficial results we have found. It is to be understood that compounds containing other groups that destroy the excess cyclizing reagent might also be used. Our invention lies in the discovery that improved yields result from the addition of a material that destroys unreacted reagent, and not in the discovery of which materials will destroy this reagent.

After the additive has been added to the solution, the solvent is removed by evaporation, preferably at reduced pressure. The solvent so removed may be recovered and reused in the reaction. The evaporation of the solvent leaves a viscous residue from which 7-ACA may be obtained.

Recovery of 7-ACA from the viscous residue may be accomplished in any of a number of ways. In U.S. Pat. 3,188,311 the residue is dissolved in water and the 7-ACA is precipitated by the addition of a base. In U.S. Pat. 3,367,933 methanol is used instead of water and the 7-ACA is again precipitated by the addition of a base. The residue may be dissolved in either water or a lower alkanol and the 7-ACA then precipitated by the addition of an alkylene oxide. Finally, the residue may be treated with an alkylene oxide without first being dissolved in water or an alcohol. The alkylene oxide is preferably in solution in an inert solvent such as a diluent of the type used in the cleavage reaction. A solid product is obtained from the residue in this way. The particular manner in which the 7-ACA is recovered from the residue is not important to our process.

In a particularly preferred embodiment of our process the sodium salt of cephalosporin C is treated with nitrosyl chloride in a mixed solvent of formic acid and acetonitrile at a temperature between −10° and +5° C. At the completion of the reaction the excess nitrosyl chloride is destroyed by the addition of ammonium sulfamate, the solvent is removed by evaporation, and the residue is dissolved in water. 7-ACA is then precipitated from the aqueous solution by the addition of ammonium hydroxide to a pH of about 3.5.

Our improved process will be further illustrated by the following examples. In all the examples the purity of the product was determined by ultraviolet spectroscopy and the yield figure corrected to reflect the yield of 100 percent 7-ACA. The cephalosporin C referred to in the examples is actually the sodium salt monohydrate.

EXAMPLE I

A solution of 28 g. of cephalosporin C in a mixture of 150 ml. of formic acid and 100 ml. of acetonitrile was cooled to −8° C. and 6.3 ml. of nitrosyl chloride in 50 ml. of acetonitrile was added over 4 minutes. The mixture was stirred at 0° C. for an additional 11 minutes and then 7.5 g. of ammonium sulfamate was added gradually with cooling to keep the temperature below 4° C. The reaction mixture was then concentrated under vacuum. The resulting viscous residue was dissolved in 200 ml. of ice water and the pH was adjusted to 3.5 with 20 ml. of 28 percent ammonium hydroxide. After allowing the aqueous solution to stand at 0° C. for one hour the precipitated 7-ACA was collected by filtration. The product was washed with 50 ml. of ice water followed by 100 ml. of acetone and dried in a vacuum oven at 42° C. 7-ACA was obtained in 47 percent yield.

EXAMPLE II

Cephalosporin C (56 g.) was allowed to react with nitrosyl chloride as in Example I. Prior to evaporation of the solvents 8 g. of ammonium sulfamate was added. The viscous residue from the evaporation was slurried with 300 ml. of acetonitrile containing 80 ml. of propylene oxide. The slurry was allowed to stand for 15 minutes, and the insoluble product was collected by filtration and washed with 100 ml. of acetonitrile. The yield of dried 7-ACA was 53.2 percent.

EXAMPLES III–XXXII

A series of runs was made using 28 g. of cephalosporin C and 6.5 ml. of nitrosyl chloride (6.3 ml. in Examples XXI–XXVIII) in a mixed solvent of formic acid and acetonitrile. In Examples III–VII no additive was added prior to evaporation of the solvent while in Examples VIII–XXXII an additive was employed. The residue from the evaporation was taken up in water or an alcohol and the 7-ACA was precipitated by the addition of a base or an alkylene oxide. The results are presented in Table 1. In Examples XIII–XVII an amount of water ranging from 52 to 180 ml. was added after addition of the ammonium hydroxide.

As can be seen from Examples III–VII, the yields when no additive is employed average about 30 percent. When an additive is used the yields are from about 40 percent to 57 percent.

EXAMPLES XXXIII–XXXVI

In these examples cephalosporin C was treated with nitrosyl chloride as in the preceding examples employing formic acid and a diluent as solvent. In all but Example XXVI, 28 g. of cephalosporin C and 6.3 ml. of nitrosyl chloride were used. In the last example double these amounts were employed. The 7-ACA was recovered from the evaporation residue by the addition of propylene oxide in acetonitrile as in Example II. Results are summarized in Table 2.

TABLE 1

| Example | $HCO_2H$, ml. | $CH_3CN$, ml. | Additive | Grams | Residue solvent | Milliliters | Precipitant | Milliliters | Yield, percent |
|---|---|---|---|---|---|---|---|---|---|
| III | 70 | 140 | None | | $H_2O$ | 150 | $NH_4OH$ | 16 | 30.4 |
| IV | 70 | 140 | do | | $H_2O$ | 150 | Same as above | 17.5 | 30.7 |
| V | 70 | 210 | do | | $H_2O$ | 150 | do | 18.6 | 27.2 |
| VI | 100 | 210 | do | | $H_2O$ | 150 | do | 15.2 | 29.6 |
| VII | 100 | 210 | do | | $H_2O$ | 150 | do | 17.6 | 31.7 |
| VIII | 100 | 210 | $NH_4SO_3NH_2$ | 5 | $H_2O$ | 150 | do | 20.0 | 42.8 |
| IX | 100 | 210 | Same as above | 5 | 95% $C_2H_5OH$ | 150 | do | 8.3 | 56.7 |
| X | 100 | 210 | do | 5 | $H_2O$ | 150 | do | 18.8 | 46.2 |
| XI | 100 | 210 | do | 2.5 | $H_2O$ | 150 | do | 17.2 | 40.6 |
| XII | 100 | 210 | do | 7.5 | $H_2O$ | 150 | do | 23.2 | 45.7 |
| XIII | 100 | 210 | do | 5 | 100% $C_2H_5OH$ | 150 | do | 15.6 | 52.4 |
| XIV | 100 | 210 | do | 5 | Same as above | 150 | Propylene oxide | 20 | 43.2 |
| XV | 100 | 210 | do | 2.5 | do | 150 | do | 30 | 43.2 |
| XVI | 100 | 210 | do | 2.5 | do | 150 | do | 40 | 41.4 |
| XVII | 100 | 210 | do | 7.5 | do | 150 | $NH_4OH$ | 6.8 | 48.5 |
| XVIII | 100 | 210 | do | 1.5 | 95% $C_2H_5OH$ | 150 | Same as above | 4.4 | 45.1 |
| XIX | 100 | 210 | do | 5 | 90% $C_2H_5OH$ | 150 | do | 6.0 | 49.6 |
| XX | 100 | 210 | do | 7.5 | 50% $C_2H_5OH$ | 300 | do | 10.6 | 47.7 |
| XXI | 80 | 210 | $NH_2-\overset{S}{\underset{\|}{C}}-NHNH_2$ | 5 | $H_2O$ | 200 | do | 22 | 42.8 |
| XXII | 100 | 200 | $NH_2-\overset{O}{\underset{\|}{C}}-NHNH_2$ | 5 | $H_2O$ | 200 | do | 21 | 40.8 |
| XXIII | 100 | 200 | $NH_2-\overset{S}{\underset{\|}{C}}-NH_2$ | 4 | $H_2O$ | 200 | do | 19 | 40.8 |
| XXIV | 150 | 150 | $NH_2-\overset{O}{\underset{\|}{C}}-NHNH_2$ | 7.5 | $H_2O$ | 200 | do | 20 | 42.2 |
| XXV | 150 | 150 | $NH_2NH_2$; $CH_3CN$ | ¹1, 10 | $H_2O$ | 200 | do | 20 | 42.3 |
| XXVI | 150 | 150 | $NH_2-\overset{S}{\underset{\|}{C}}-NHNH_2$ | 7.5 | $H_2O$ | 200 | do | 20 | 40.5 |
| XXVII | 100 | 200 | $CH_3NHNH_2$ | ¹2 | $H_2O$ | 200 | do | 18 | 43.0 |
| XXVIII | 100 | 200 | $(CH_3)_2-C=CH_2$ | ¹10 | $H_2O$ | 200 | do | 17 | 44.8 |
| XXIX | 100 | 200 | $CH_2=CH-CH=CH_2$ | ¹5 | $H_2O$ | 200 | do | 18 | 37.7 |
| XXX | 100 | 200 | $H_2NNH-\overset{O}{\underset{\|}{C}}-O-C_2H_5$ | 10 | $H_2O$ | 200 | do | 29 | 37.0 |
| XXXI | 100 | 200 | $[(H_2NNH\overset{O}{\underset{\|}{C}}CH_2-)_2NCH_2-]_2$ | 5 | $H_2O$ | 200 | do | 30 | 39.3 |
| XXXII | 100 | 200 | $CH_3SO_2NHNH_2$ | 10 | $H_2O$ | 200 | do | 18 | 42.7 |

¹ Milliliters.

TABLE 2

| Example | $HCO_2H$, ml. | Diluent | Milliliters | Additive | Grams | Residue treatment | Yield, percent |
|---|---|---|---|---|---|---|---|
| XXXIII | 100 | $CH_3CN$ | 200 | $NH_4SO_3NH_2$ | 5 | 30 ml. propylene oxide in 50 ml. $CH_3CN$, wash with 600 ml. $CH_3OH$. | 44.4 |
| XXXIV | 100 | $CH_3CN$ | 200 | Same as above | 4 | 40 ml. propylene oxide in 100 ml. $CH_3CN$, wash with 200 ml. $CH_3CN$. | 49.1 |
| XXXV | 100 | $CH_3NO_2+CH_3CHNO_2CH_3$ | 210 | do | 4 | 35 ml. propylene oxide in 150 ml. $CH_3CN$, wash with 200 ml. $CH_3CN$. | 40.0 |
| XXXVI | 200 | $CH_3CN$ | 380 | do | 8 | 80 ml. propylene oxide in 300 ml. $CH_2CH$, wash with 200 ml. $CH_3CN$. | 51.9 |

We have also found that additional beneficial results are obtained if, in addition to an additive of the type described hereinabove, there is also added an acid that is stronger than formic acid. This acid may be either organic or inorganic. Examples of such acids include sulfuric acid, phosphoric acid, trichloroacetic acid, trifluoroacetic acid, oxalic acid, methanesulfonic acid, and toluenesulfonic acid. Methanesulfonic acid is particularly preferred. The amount of acid to be used is within the range of about 0.3–1.5 equivalents per mole of nitrosyl chloride employed in the reaction.

The acid is added with the additive prior to the evaporation step. The use of an acid will be further illustrated by the following examples.

EXAMPLE XXXVII

Example I was repeated except that instead of the ammonium sulfamate there were added 7.5 g. of thiosemicarbazide and 10 ml. of methanesulfonic acid. After concentration of the reaction mixture the residue was dissolved in 200 ml. of ice water. The pH was adjusted to 3.5 by the addition of 25 ml. of ammonium hydroxide. The yield of 7-ACA was 47.4 percent. In Example XXVI when thiosemicarbazide was used alone the yield was 40.5 percent.

Other examples in which an acid was used with the additive are listed in Table 3. In virtually every case the yield using the combination was substantially higher than when the additive was used alone. In general, it appears that the greatest benefit to be derived from the use of an acid is with those additives which do not result in large yield increases when used alone; i.e., those additives which do not produce yields in excess of about 40 percent when used alone.

rating the solvent from the reaction mixture to leave a residue, and recovering 7-aminocephalosporanic acid from the residue, the improvement which comprises adding a substance that destroys excess reagent to the reaction mixture prior to the evaporation of the solvent, said substance being selected from the class consisting of compounds having one of the following formulas $$MSO_3NH_2$$

$$YSO_2NH_2$$

$$YSO_2NHNH_2$$

$$H_2N-\overset{\overset{X}{\|}}{C}-NHNH_2$$

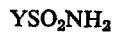

$$R_2NNH-\overset{\overset{X}{\|}}{C}-NHNH_2$$

$$R_2N-\overset{\overset{S}{\|}}{C}-NH_2$$

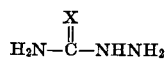

$$H_2N-\overset{\overset{X}{\|}}{C}-OR'$$

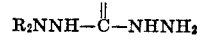

$$H_2NNH-\overset{\overset{X}{\|}}{C}-OR'$$

$$R_2N-NH_2$$

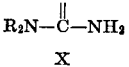

$$R'-\overset{\overset{X}{\|}}{C}-NHNH_2$$

$$Z_2C=CHZ$$

wherein
M is hydrogen, $NR_4$, or an alkali metal;
X is oxygen or sulfur;
Y is R or $NR_2$;

TABLE 3

| Example | $HCO_2H$, ml. | $CH_3CN$, ml. | Additive | Amount | Residue solvent | Milliliters | Precipitant | Milliliters | Yield, percent |
|---|---|---|---|---|---|---|---|---|---|
| XXXVIII | 100 | 200 | $NH_2-\overset{\overset{S}{\|}}{C}-NHNH_2$ / $CF_3CO_2H$ | 4 g. / 5 ml. | $H_2O$ | 200 | $NH_4OH$ | 21 | 43.8 |
| XXXIX | 100 | 200 | $NH_2-\overset{\overset{O}{\|}}{C}-NHNH_2$ / $CH_3SO_3H$ | 4 g. / 5 ml. | $H_2O$ | 200 | Same | 25 | 43.1 |
| XL | 100 | 200 | $CH_3NHNH_2$ / $CH_3SO_3H$ | 1 ml. / 10 ml. | $H_2O$ | 200 | ...do | 20 | 46.6 |
| XLI | 100 | 200 | $CH_2=CH-CH=CH_2$ / $CH_3SO_3H$ | 5 ml. / 10 ml. | $H_2O$ | 200 | ...do | 20 | 49.7 |
| XLII | 100 | 200 | $H_2NNH-\overset{\overset{O}{\|}}{C}-OC_2H_5$ / $CH_3SO_3H$ | 10 g. / 10 ml. | $H_2O$ | 200 | ...do | 31 | 54.0 |
| XLIII | 100 | 200 | $(CH_3)_2-C=CH_2$ / $CH_3SO_3H$ | 5 ml. / 10 ml. | $H_2O$ | 200 | ...do | 24 | 47.9 |
| XLIV | 100 | 200 | $H_2NNH-\overset{\overset{O}{\|}}{C}-OC_2H_5$ / $CH_3SO_3H$ | 5 g. / 5 ml. | $H_2O$ | 200 | ...do | 20 | 49.6 |
| XLV | 100 | 200 | $H_2NNH-\overset{\overset{O}{\|}}{C}-NHNH_2$ / $CH_3SO_3H$ | 4.5 g. / 10 ml. | $H_2O$ | 200 | ...do | 24 | 42.8 |
| XLVI | 100 | 200 | $H_2N-\overset{\overset{S}{\|}}{C}-NH_2$ / $CH_3SO_3H$ | 7.6 g. / 10 ml. | $H_2O$ | 200 | ...do | 25 | 46.1 |
| XLVII | 100 | 200 | $(CH_3)_2-C=CH_2$ / $CH_3SO_3H$ | 5 ml. / 10 ml. | $H_2O$ | 200 | ...do | 24 | 50.0 |
| XLVIII | 100 | 200 | $CH_3SO_2NHNH_2$ / $CH_3SO_3H$ | 5 g. / 5 ml. | $H_2O$ | 200 | ...do | 43.0 |

We claim:
1. In a process for the production of 7-aminocephalosporanic acid by treating a cephalosporin compound selected from the class consisting of cephalosporin C and salts thereof with a reagent selected from the class consisting of nitrosating agents, carbocyclic arenediazonium salts, and compounds that afford positive halogen at a temperature of not more than 60° C. in a solvent, evapo-

Z, taken alone, is R or a group having the formula

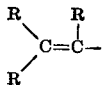

or two Z's together with the atoms to which they are attached form a ring containing five or six carbon atoms;

R is hydrogen, $C_1$-$C_6$ alkyl, or $C_6$-$C_{12}$ aryl or aralkyl; and

R' is $C_1$-$C_6$ alkyl or $C_6$-$C_{12}$ aryl or aralkyl.

2. A method as in claim 1 wherein the solvent is a mixture of formic acid and a diluent selected from the class consisting of acetonitrile and a mixture of nitromethane and 2-nitropropane.

3. A method as in claim 1 wherein the reagent is nitrosyl chloride.

4. A method as in claim 3 wherein the substance employed to destroy excess nitrosyl chloride is ammonium sulfamate.

5. A method as in claim 4 wherein the solvent is a mixture of formic acid and a diluent selected from the class consisting of acetonitrile and a mixutre of nitromethane and 2-nitropropane.

6. A method for the production of 7-aminocephalosporanic acid which comprises treating the sodium salt of cephalosporin C with nitrosyl chloride in a mixed solvent of formic acid and acetonitrile at a temperature within the range of about $-10°$ to $+5°$ C., adding ammonium sulfamate to the reaction mixture to destroy excess nitrosyl chloride, evaporating the solvent, dissolving the residue in water, and adding ammonium hydroxide to a pH of about 3.5 to precipitate the 7-aminocephalosporanic acid.

References Cited
UNITED STATES PATENTS

| | | | |
|---|---|---|---|
| 3,367,933 | 2/1962 | Eardley et al. | 260—243C |
| 3,507,862 | 4/1970 | Stamper et al. | 260—243C |

NICHOLAS S. RIZZO, Primary Exmainer